VARIABLE TONE CONTROL CIRCUIT

Filed Sept. 1, 1953

INVENTORS
Roy S. Fine &
Sydney V. Perry

BY H. O. Newton

ATTORNEY 2,802,063
Patented Aug. 6, 1957

2,802,063

VARIABLE TONE CONTROL CIRCUIT

Roy S. Fine, Haddonfield, and Sydney V. Perry, Audubon, N. J., assignors to Radio Corporation of America, a corporation of Delaware Application September 1, 1953, Serial No. 377,806

2 Claims. (Cl. 179—171)

Figure 1:
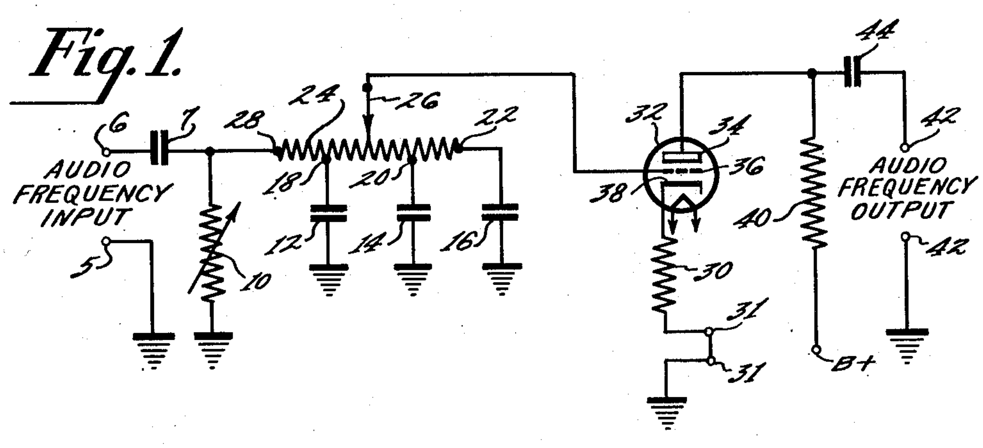

This invention relates to radio signal receiving apparatus and the like, and more particularly to audio frequency amplifiers for such apparatus and tone control circuits therefor.

In many types of audio frequency signal conveying and amplifying circuits used in radio receiving and like apparatus, it is desirable to provide tone control means by which the frequency response characteristic in the higher end of the audio frequency range is controlled or varied, while the response to signals in the lower frequency end of the range are maintained relatively constant.

To achieve this desired result in the past, numerous circuits have been employed, some of which involve extensive impedance networks or a large number of electrical components, resulting in relatively high cost, and complication in construction.

Accordingly, it is an object of this invention to provide an improved tone control circuit for attenuating audio frequency signal amplifiers and the like which is effective to signals in the higher end of the audio frequency range without involving complicated circuitry or components.

Some types of tone controls employ variable resistance elements in series with a capacitance element to attenuate the response to signals in the higher end of the audio range. However, such circuits provide a fixed degree of attenuation and do not provide effective means for varying the degree of such attenuation. For example, if the degree of attenuation within a certain band of high frequencies is 6 decibels per octave, no relatively simple and inexpensive means are provided to increase the degree of attenuation within this band to more than 6 decibels per octave.

Accordingly, it is a further object of this invention to provide an improved tone control circuit for audio frequency amplifiers and the like, wherein the degree of control or attenuation of the frequency response in the higher audio frequency range may be varied continuously by a relatively simple and inexpensive network means.

In a presently preferred embodiment of the invention, a continuously variable treble tone control circuit is provided. Such a circuit utilizes a tapped tone control potentiometer resistor with controlling capacitors connected from each tap to ground or to one side of the signal channel, and a tone control capacitor connected from the low potential end of the potentiometer resistor to ground. By moving the contact arm of the potentiometer resistor to different positions, either on the taps or intermediate the taps, the point of contact may be adjusted to determine the degree of attenuation of the response to the higher audio frequencies. The movable contact arm is preferably directly connected to a high impedance output circuit such as the grid input circuit of an amplifier tube. The high potential input end of the potentiometer is connected to one end of a load resistor or impedance element in a preceding circuit of the signal channel. Audio frequency signal voltage is applied across the load resistor. As the arm of the potentiometer is moved towards the lower taps, attenuation of 12 decibels, 18 decibels or more per octave may be attained, the amount of attenuation depending upon the number of taps and capacitances employed in the circuit.

Figure 2:
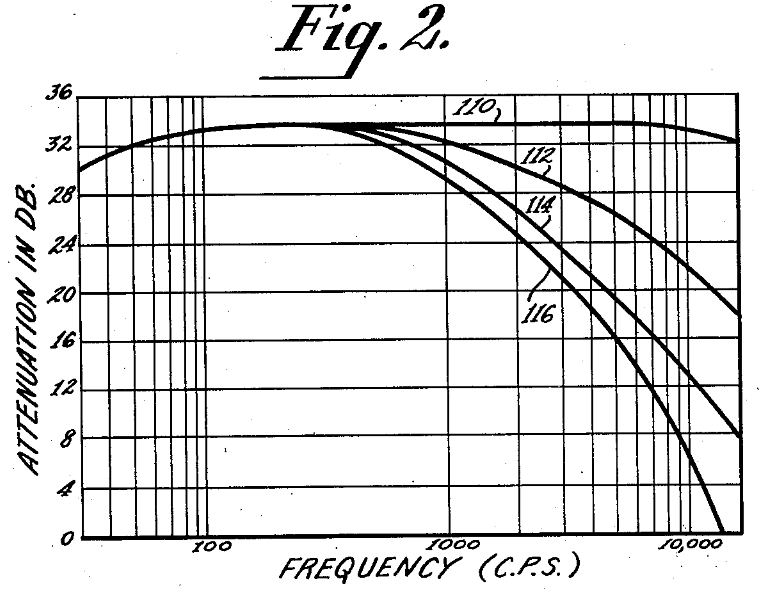

A further understanding of the invention may be obtained from a consideration of the following description and with reference to the accompanying drawing in which:

Figure 1 is a schematic circuit diagram of a high frequency tone control circuit embodying the invention, and Figure 2 is a graph showing curves representing certain frequency response characteristics of the tone control circuit illustrated in Figure 1.

Referring particularly to Figure 1, a source of audio frequency signal voltage, represented by input terminals 5—6, is connected through a coupling capacitor 6 across an input or load resistor 10, one end of which is connected to a point of reference potential, such as ground for the system, as indicated.

The tone control circuit for the higher audio frequencies further includes a series of continuously variable R-C sections in parallel relationship with the resistor 10 and in which the controlling element is a potentiometer resistor 24 having a series of spaced taps 18 and 20 between its ends and a movable contact or contact arm 26. Series capacitors 12 and 14 are connected from the taps 18 and 20 to ground. Likewise, at the low potential end 22, a capacitor 16 is connected to ground as shown. This is effectively the end tap for the circuit and is spaced along the potentiometer from the intermediate tap 20 as is the high potential or input terminal or end 28. The end 28 is connected with the signal supply circuit at the high potential end of the input or load resistor 10. The values of the series capacitors 12, 14 and 16 are substantially equal and such that they offer a relatively low impedance to the higher audio frequency signals and a relatively high impedance to the lower range audio frequency signals. The movable arm or contact 26 on the potentiometer is connected to the grid 36 of an amplifier tube 32 in the following stage. The cathode 38 is connected to ground through a cathode biasing resistor 28 and terminals 31 through which feed-back may be introduced if desired. As shown the terminals are connected together thereby completing the cathode connection to ground. The plate 34 may be connected across an anode coupling resistor 40 to any utilization circuit through output terminals 42. A coupling capacitor 44 completes the connection with the terminals 42.

Referring to Figure 2 of the drawing and the series of characteristic curves illustrating the frequency response of the tone control circuit shown in Figure 1, when an audio signal voltage is developed across the load resistor 10, it is applied through the tone control circuit and the potentiometer resistor 24 serially to the grid 36 of the amplifier tube 32 dependent upon the position of the movable contact arm 26.

When the contact arm is positioned at the input end of the potentiometer, as at the terminal 28, the voltage applied to the grid is represented by the response curve 110. It is seen that when the contact arm is positioned at this point the response to all signals within the audio frequency range is substantially constant.

When the contact arm is moved towards the low potential end, the resistance of the potentiometer is serially included in the signal paths to ground through the capacitors 12, 14 and 16. The voltage signal across the potentiometer 24 and the capacitors is substantially constant at all frequencies. The voltages across the capacitors are substantially independent of the position of the potentiometer adjustment and depend upon the frequency of the impressed signal voltage.

When the contact arm is moved to contact the first tap 18, the portion of the resistance between the input terminal 28 and tap 18 and the capacitor 12, in effect form a series resistance-capacitance network. The voltage drop across the capacitor 12 is dependent upon the frequency of the applied audio signal voltage. At the higher audio frequencies, the voltage developed across the capacitor 12 is less than the voltage developed at the lower frequencies and effectively attenuation for the higher audio frequencies is attained. The response curve 112 illustrates the frequency response of the tone control circuit shown in Figure 1, when the contact arm is at the tap 18. At this position, a maximum attenuation of 6 decibels per octave is achieved.

When the contact arm is moved to the second tap 20, a different portion of the tone control circuit is applied to the grid 36 of the tube 32. In effect movement of the contact arm to this position provides a connection for an additional resistance-capacitance series network in parallel with the capacitor 12. This resistance-capacitance network comprises the portion of the resistance of the potentiometer between the taps 18 and 20 in series with the capacitance 14. The voltage drop across the capacitance 14 is dependent upon the frequency of the applied audio signal voltage. At the higher audio frequencies, the voltage developed across the capacitance 14 is less than the voltage developed at the lower frequencies. Thus it is seen that two stage attenuation of the higher audio frequencies is attained. At the same time, the lower frequency signal voltages are maintained substantially constant.

Since this attenuated voltage is connected across the network comprising the portion of the resistance between taps 18 and 20 and capacitance 14, it is seen that the action of capacitance 14 will result in a further second stage attenuation of the higher audio frequencies. This condition of operation is illustrated by the characteristic or response curve 114. It is seen from the curve 114 that the attenuation of the higher audio frequencies is much greater with the contact arm located at the tap 20 than when located at the tap 18.

If the slider arm is moved further down to contact low voltage end or terminal 22 of the potentiometer resistors, the signal voltage across the capacitor 16 is applied across the grid-cathode circuit of the amplifier tube 32. It may be seen that a series resistance-capacitance circuit is connected across the capacitance 14. This resistance is that portion of the potentiometer resistor between the tap 20 and the end tap or terminal 22 and the capacitance is that of the capacitor 16. The voltage developed across the capacitor 16 is dependent upon the frequency of the applied audio signal voltage, the voltage developed being lower for the higher audio frequencies and substantially constant for the lower audio frequencies. The frequency response of the tone control circuit when the contact arm is at the output or low voltage end of the potentiometer is illustrated by the characteristic or response curve 116. It is seen that the attenuation of the higher audio frequencies is highest in this position and provides substantially a three stage filter.

In connection with the circuit herein described, it should be noted that the usual grid resistor is not connected across the grid input circuit. This permits a maximum impedance across the grid input circuit, thus offering a minimum load for the tone control circuit. As may be seen, the grid return circuit to ground is serially through a portion of the potentiometer or tone control resistor, thence to ground through the load or input resistor 10. This may be made variable as indicated to control the input impedance of the tone control network. Such an arrangement, it has been found, further aids in preventing variations in the setting of the tone control system, by movement of the contact arm, from affecting the volume, or signal level of the lower audio frequencies.

In an embodiment of this invention, it is desirable that the value of the portions of the resistors between the individual taps and also between the end points of the potentiometer and their nearest adjacent taps be substantially equal in value, with the capacitors used in connection with the resistor portions also being of equal value as noted hereinbefore. This permits attenuation of higher audio frequency to start very close to a predetermined frequency, dependent upon the relative values of the resistor sections and the reactance of the individual capacitors used in connection therewith. If all the resistor sections and capacitors are equal in value, the frequency close to which the attenuation takes place will be substantially the same at all points on the potentiometer. In order for attenuation to start at substantially the same point in the frequency range, as indicated in Figure 2, for example, it is not necessary that the resistance-capacitance networks be equal in value. However, the relationship between each resistance section and each capacitive reactance element should have a proportional relationship so that the percentage of voltage developed across the capacitive reactance as compared with the percentage of voltage developed across the resistance is substantially the same.

If sharper attenuation of the higher frequencies than that shown is desired, additional taps in the potentiometer may be provided to permit additional capacitors to be connected from the taps to ground. Any number of sections may be added to further increase the slope or attenuation of the higher audio frequencies.

Since the capacitance 16 offers a high impedance to the lower audio frequencies, the movable contact 26 may be moved without audibly affecting the volume level of the lower audio frequencies.

It is seen that by varying the positions of the contact arm on the potentiometer, that various degrees of attenuation of the higher audio frequencies is readily attainable. Such varying degrees of attenuation is attained by a relatively simple circuit arrangement involving a capacitance-resistive network providing a multi-stage filter, each successive stage of which comprises a portion of the potentiometer resistor and a series capacitor or capacitive reactive element to ground, the successive stages being connected in parallel with the capacitor reactance element of the preceding stage. The final portion of the potentiometer resistor is also connected to ground through a capacitor so that the whole network provides continuous control of tone and high frequency attenuation at different rates.

The use of such a tone control circuit involves relatively inexpensive parts, and permits incorporation of desirable tone control characteristics having variable cutoff in equipments which heretofore could not be provided practically because of its relatively high cost.

What is claimed is:

1. A continuously variable audio frequency tone control system comprising an audio frequency signal supply circuit, a resistor connected with said supply circuit having one end connected with the high signal potential side of said circuit and the other end connected to ground for said system, a potentiometer connected at said one end to said supply circuit, said potentiometer having a movable contact providing a signal output connection therefor, a high impedance signal output circuit connected with said contact, a plurality of intermediate spaced taps and an end tap on said potentiometer, and a capacitor connected between each of said taps and said ground, all of said capacitors having relatively low impedance to signals in the higher audio frequency range and relatively high impedance to signals in the lower audio frequency range.

2. A continuously variable tone control system for audio frequency amplifiers and the like, comprising an audio frequency signal input circuit including a shunt load resistor, a potentiometer resistor connected at one end to said input circuit at a high signal potential end of said load resistor and having a movable contact providing a signal output connection therefor, a high impedance signal output circuit connected with said contact, a capacitor connected from the free end of said potentiometer resistor effectively to ground for said system, a plurality of intermediate spaced taps on said potentiometer resistor, and a capacitor connected between each of said taps and said ground, all of said capacitors having relatively low impedance to signals in the higher audio frequency range and relatively high impedance to signals in the lower audio frequency range, whereby said potentiometer resistor and capacitors provide a multi-stage filter for attenuating high audio frequency signals and said potentiometer provides continuous variation of the degree of attenuation by said filter.

References Cited in the file of this patent

UNITED STATES PATENTS

| | | |
|---|---|---|
| 2,167,462 | Rechnitzer | July 25, 1939 |
| 2,317,025 | Bond | Apr. 20, 1943 |
| 2,637,778 | Kodama | May 5, 1953 |

FOREIGN PATENTS

| | | |
|---|---|---|
| 681,359 | France | Oct. 22, 1952 |
| 733,448 | Great Britain | July 11, 1932 |